P. N. BRAUN.
STARCHING MACHINE.
APPLICATION FILED SEPT. 22, 1914.
1,245,999.
Patented Nov. 6, 1917.
7 SHEETS—SHEET 1.
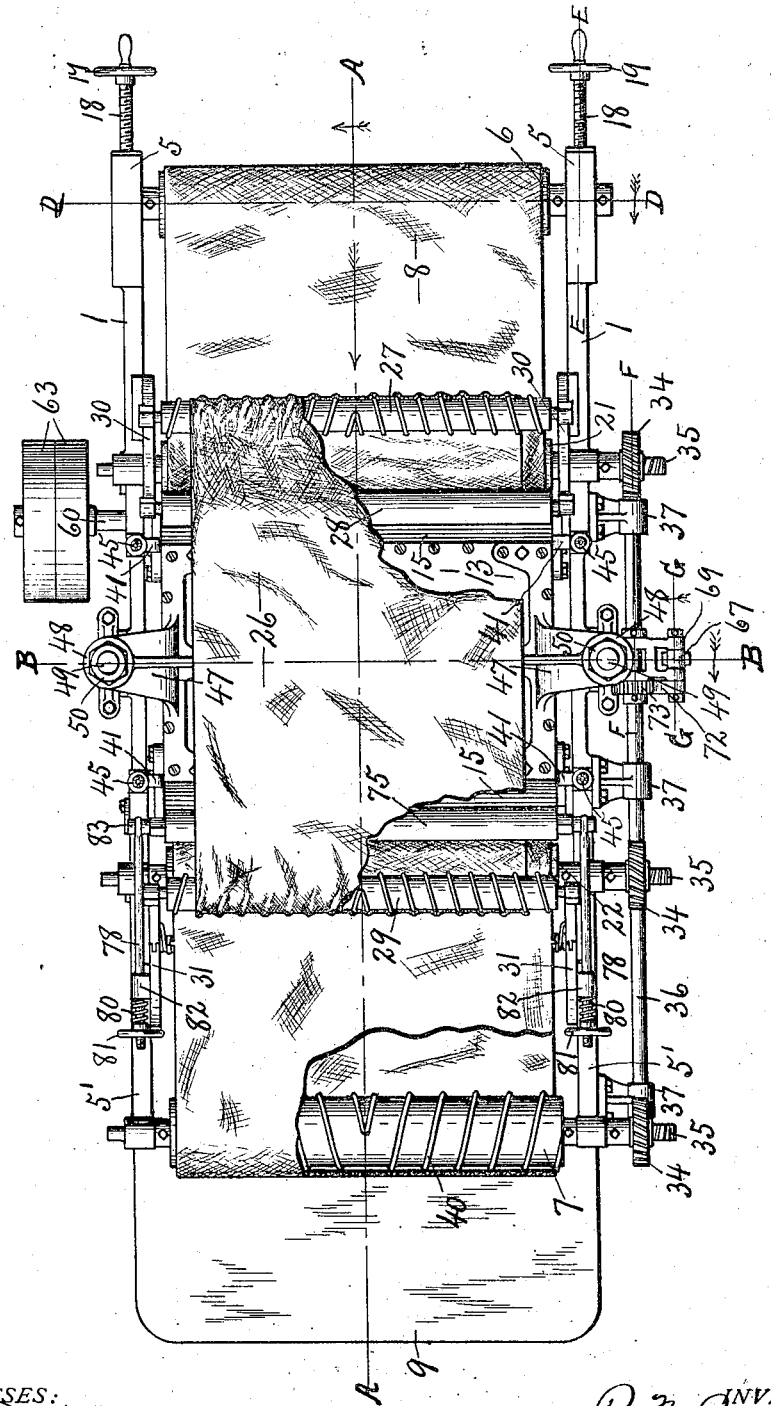
WITNESSES:
INVENTOR.
P. N. Braun
BY
Howard P. Denison
ATTORNEY.

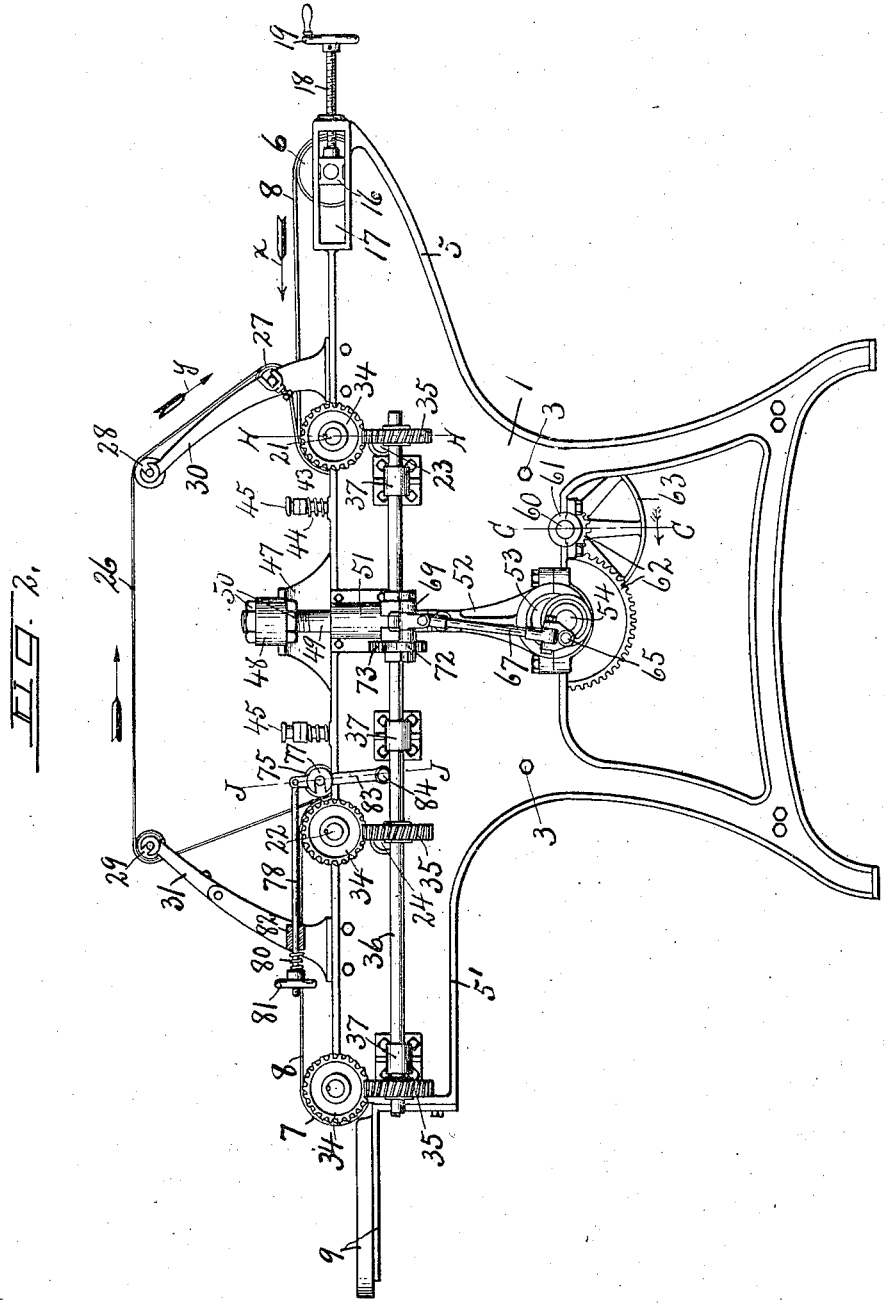

P. N. BRAUN.
STARCHING MACHINE.
APPLICATION FILED SEPT. 22, 1914.
1,245,999.
Patented Nov. 6, 1917.
7 SHEETS—SHEET 3.
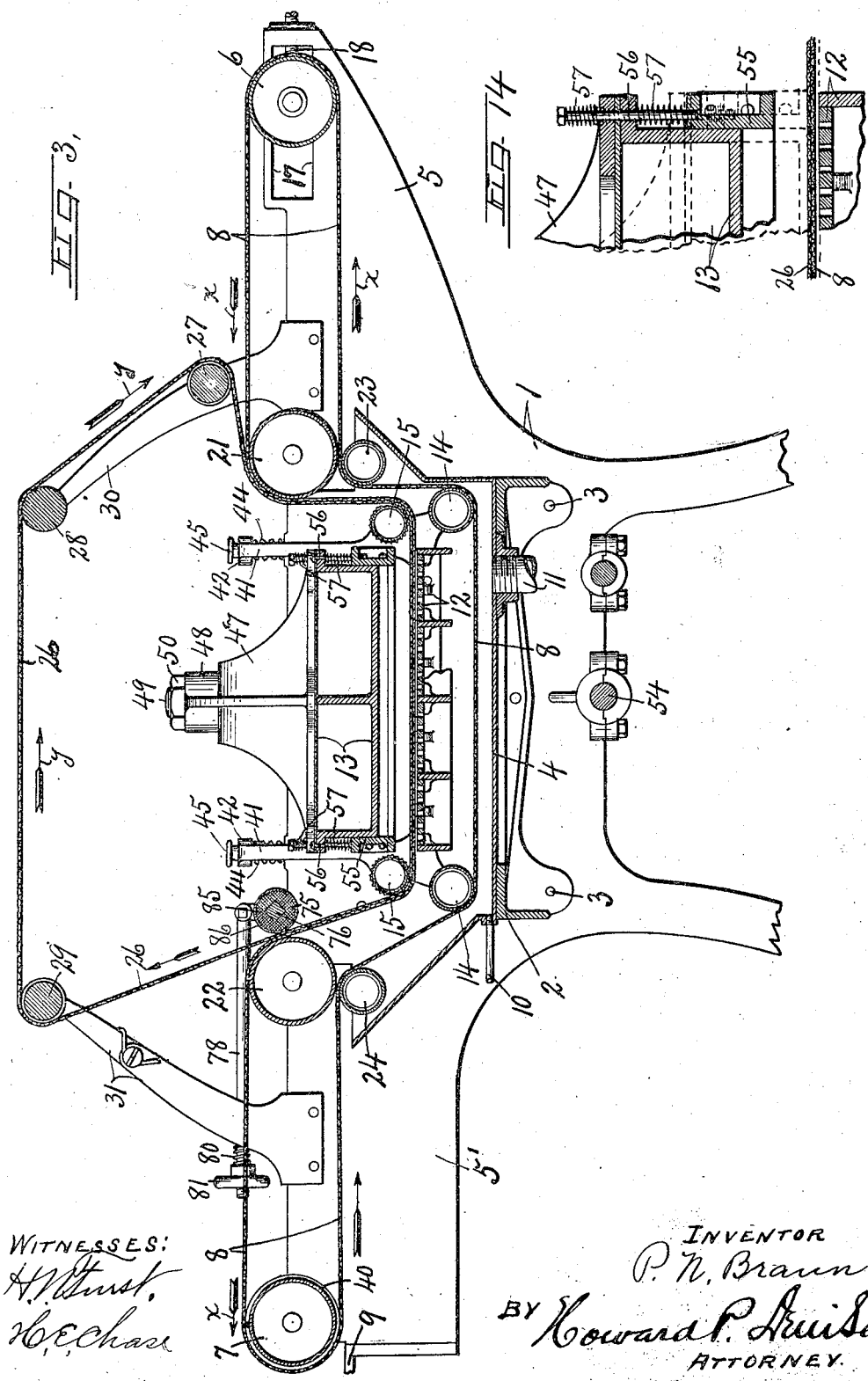

P. N. BRAUN.
STARCHING MACHINE.
APPLICATION FILED SEPT. 22, 1914.
1,245,999.
Patented Nov. 6, 1917.
7 SHEETS—SHEET 4.
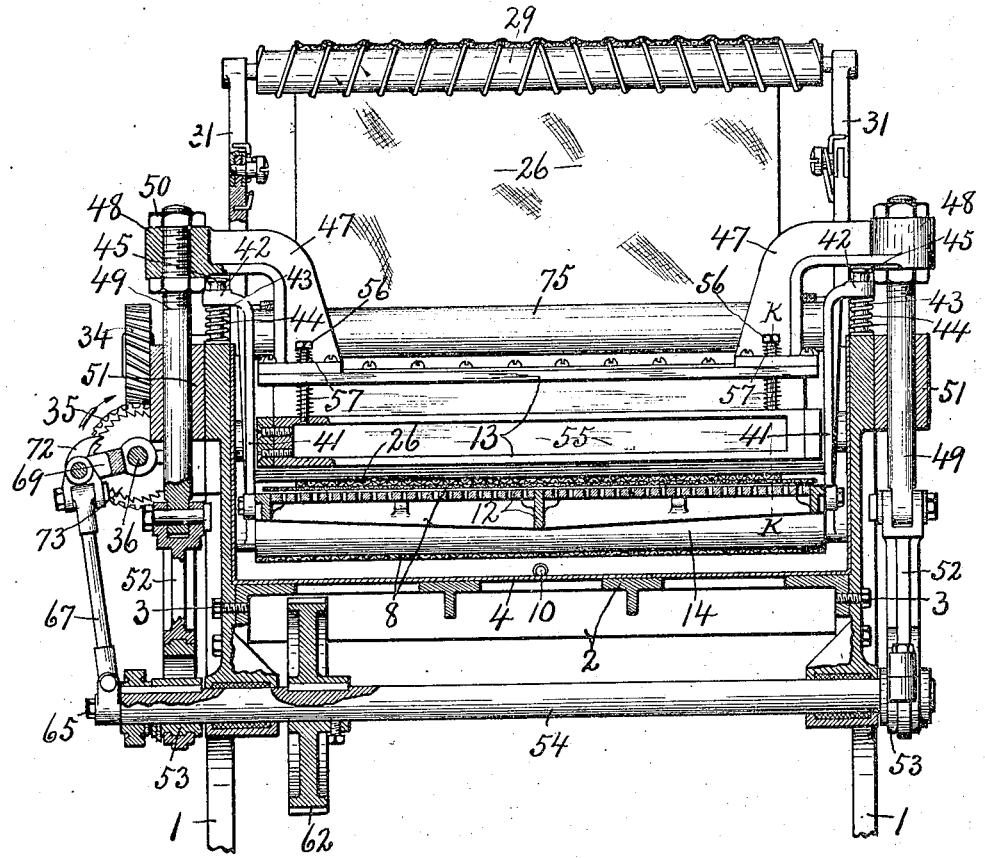
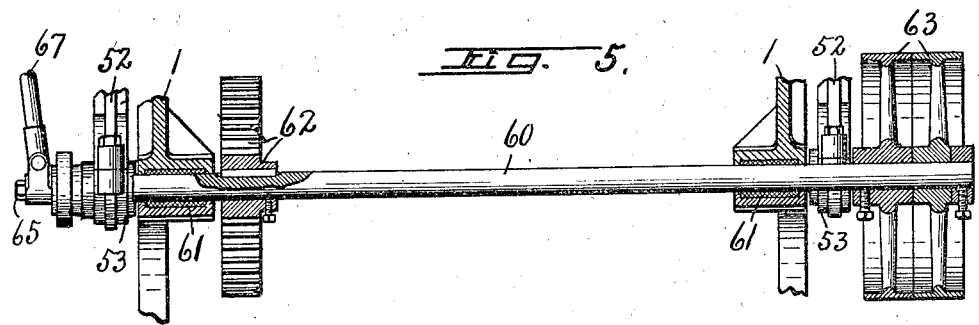
WITNESSES:
INVENTOR.
P. N. Braun
BY
Howard P. Denton
ATTORNEY.

P. N. BRAUN.
STARCHING MACHINE.
APPLICATION FILED SEPT. 22, 1914.
1,245,999.
Patented Nov. 6, 1917.
7 SHEETS—SHEET 5.
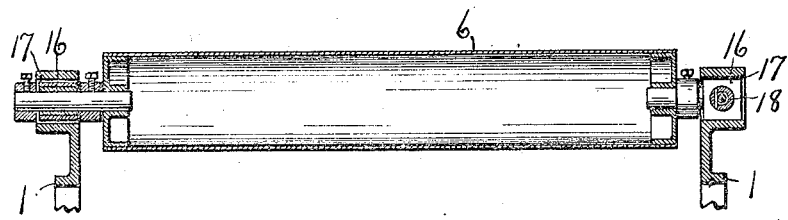
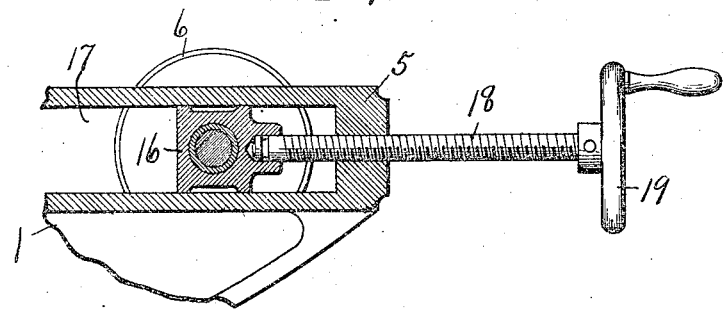
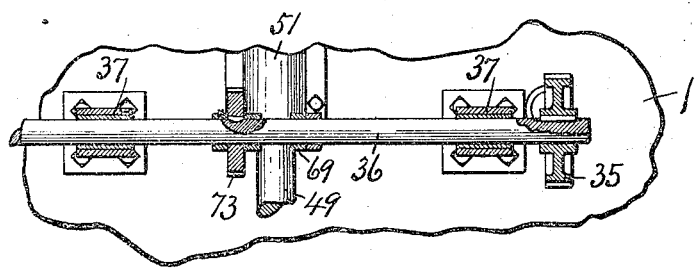
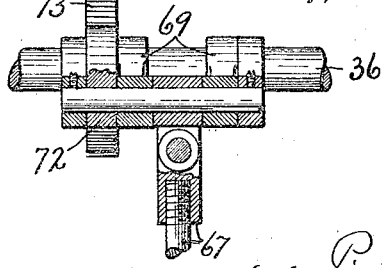

P. N. BRAUN.
STARCHING MACHINE.
APPLICATION FILED SEPT. 22, 1914.
1,245,999.
Patented Nov. 6, 1917.
7 SHEETS—SHEET 6.
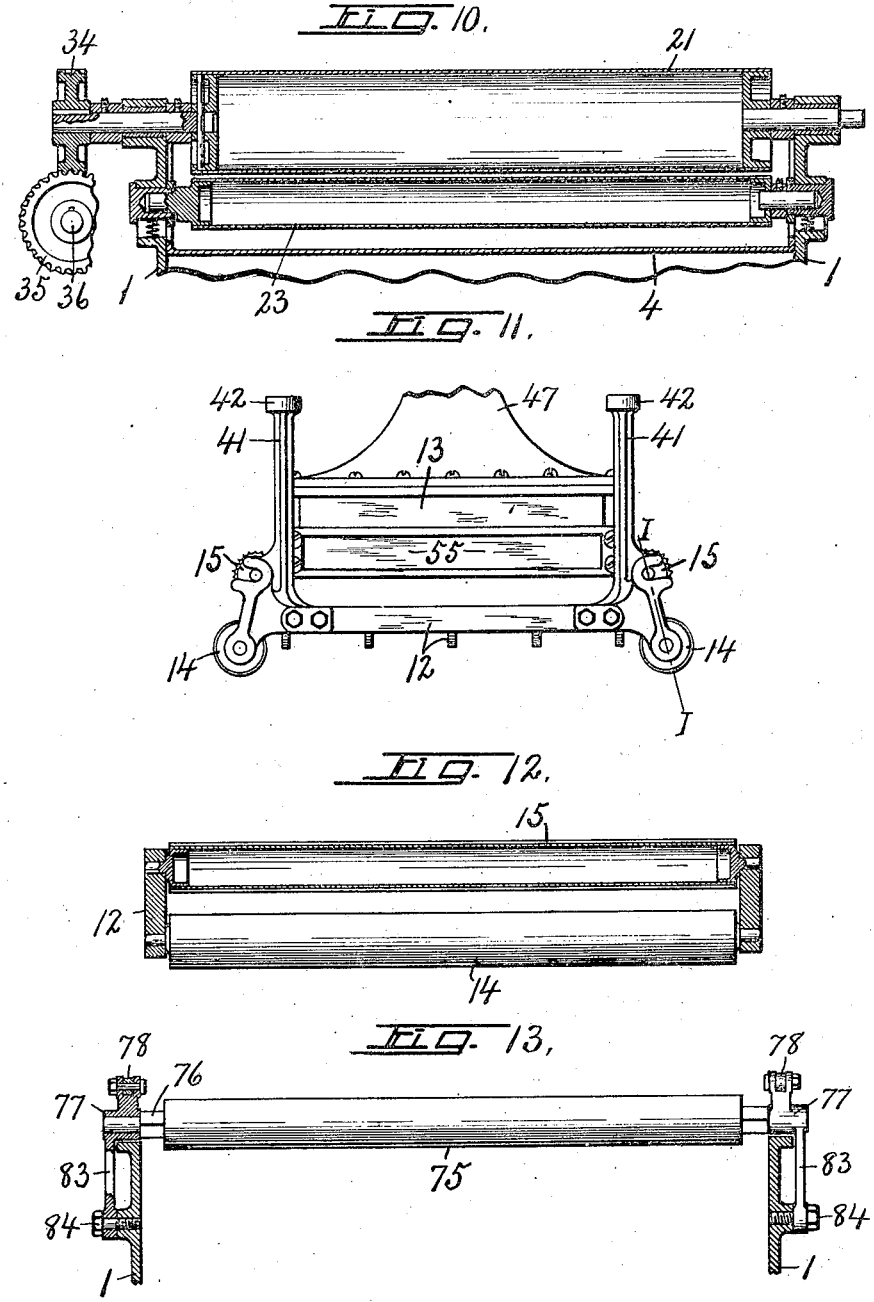

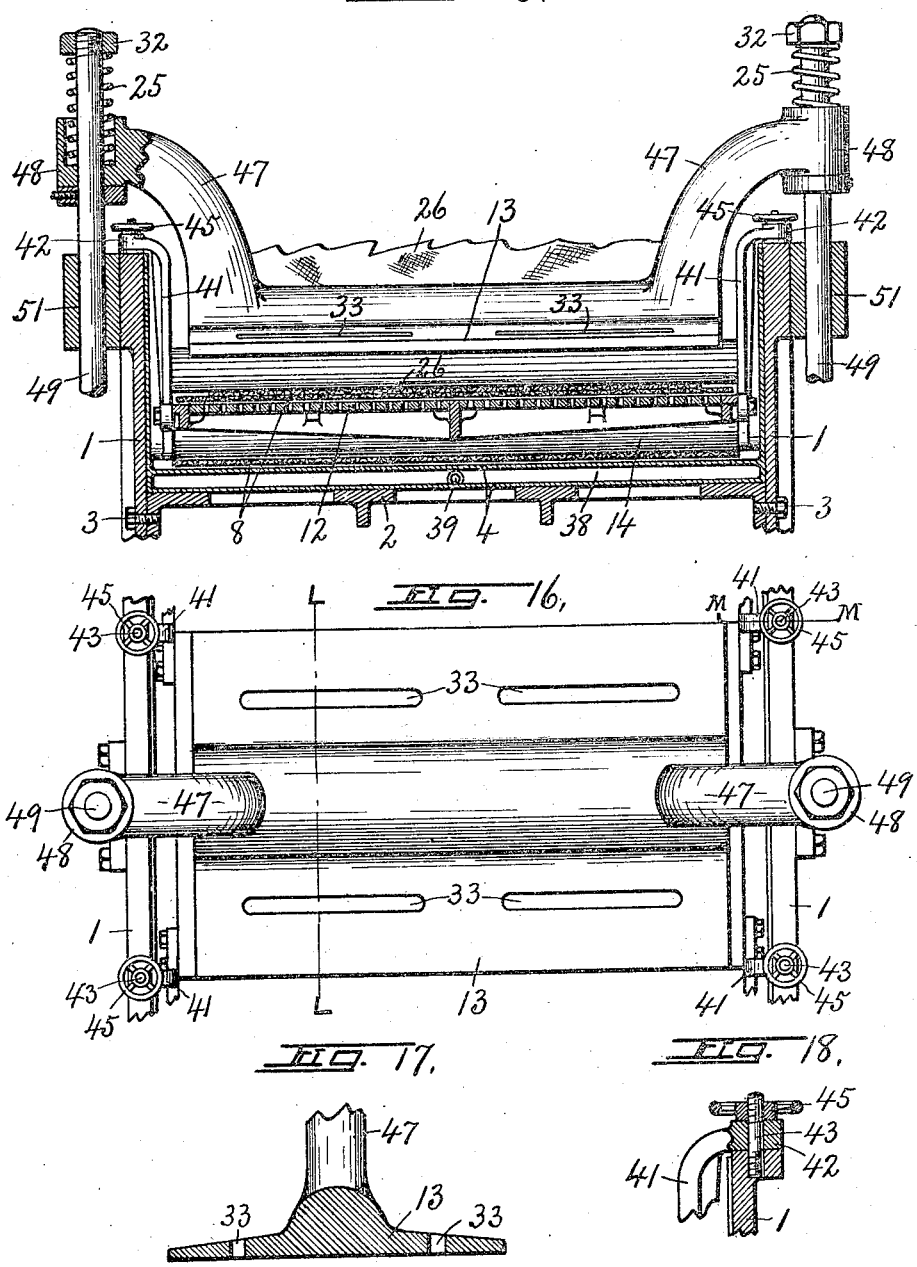

UNITED STATES PATENT OFFICE.

PHILIP N. BRAUN, OF SYRACUSE, NEW YORK, ASSIGNOR TO NATIONAL CHEMICAL COMPANY, OF SYRACUSE, NEW YORK, A CORPORATION OF NEW YORK.

STARCHING-MACHINE.

1,245,999.     Specification of Letters Patent.     Patented Nov. 6, 1917.

Application filed September 22, 1914. Serial No. 862,956.

*To all whom it may concern:*

Be it known that I, PHILIP N. BRAUN, a citizen of the United States, and resident of Syracuse, in the county of Onondaga, in the State of New York, have invented new and useful Improvements in Starching-Machines, of which the following, taken in connection with the accompanying drawings, is a full, clear, and exact description.

This invention relates to certain improvements in starching machines involving the use of endless aprons or belts having portions thereof traveling in close contact through a starch-containing vat and between reciprocatory pressing elements for feeding the articles to be starched therethrough and for forcibly projecting the starch through such articles while in transit through the vat.

Heretofore considerable difficulty has been experienced in applying the proper amount of starch and distributing it uniformly to all portions of such articles as collars, cuffs and the like, which are made up of two or more plies of fabric, owing to the fact that excessive quantities of the starch are caused to collect at the seams so that when the articles are ironed and turned or folded the seams are rendered so stiff as to break the threads of the fabric.

The primary object, therefore, of this invention is not only to mechanically apply the starch in uniform quantities to all portions of the articles but also to prevent excessive accumulations of starch on the delivery end of the aprons and thereby avoid extra deposit of such accumulations upon the articles as they emerge from the machine.

Another object is to provide one or more of the apron-supporting drums or rollers with means for straightening out any wrinkles or folds which may tend to form in the fabric apron so that the starch may pass uniformly through the active portions thereof and therefore through the articles carried thereby.

A further object is to synchronize the movements of the pressing elements and aprons so that the latter will be at rest during the pressing operation and will move intermittingly only when the pressing elements are separated.

A still further object is to elevate all springs and sliding connections between the reciprocating pressing elements and their actuating means above the level of the starch in the vat so as to avoid as far as possible discoloring of the starch resulting from rust or abrasion.

Other objects and uses relating to the specific parts of the machine will be brought out in the following description.

In the drawings—

Figure 1 is a top plan of a starching machine embodying the various features of this invention, a portion of the fabric apron at the delivery end of the machine being broken away to show the spiral ribs on the adjacent drum or roller.

Fig. 2 is a side elevation of the same machine.

Fig. 3 is a longitudinal vertical sectional view on line A—A, Fig. 1.

Fig. 4 is an enlarged transverse sectional view taken on line B—B, Fig. 1.

Fig. 5 is an enlarged detail sectional view of a portion of the machine taken on line C—C, Fig. 2.

Figs. 6, 7, 8 and 9 are enlarged detail sectional views taken respectively on lines D—D, E—E, F—F, and G—G, Fig. 1.

Fig. 10 is an enlarged vertical sectional view, taken on line H—H, Fig. 2.

Fig. 11 is an end view of the detached frame carrying the bed-plate and plunger, together with the guide rollers for the aprons.

Fig. 12 is a detail vertical sectional view, taken on line I—I, Fig. 11.

Fig. 13 is a detail view of the squeezing roller showing its supporting means in section, taken on line J—J, Fig. 2.

Fig. 14 is an enlarged vertical sectional view through one side of the bed-plate and plunger, taken on line K—K, Fig. 4.

Fig. 15 is a transverse vertical sectional view similar to Fig. 4 showing modified means for supporting the pressing elements in which the lower element is rigidly held against vertical movement while the upper pressing element is yieldingly supported upon its operating rods, the sliding band being dispensed with.

Fig. 16 is a top plan of the upper pressing element and adjacent portions of the main supporting frame.

Fig. 17 is a transverse sectional view of the pressure plate of the upper pressing element taken on line L—L, Fig. 16.

Fig. 18 is a detail sectional view through one side of the frame and adjacent portion of the lower pressing element showing the clamping means therefor taken on line M—M Fig. 16.

The machine comprises a main supporting frame composed of upright side plates —1— spaced some distance apart and connected by a horizontally disposed bed-plate or cross bar —2— which is secured by bolts —3— to the inner faces of the side plates some distance below the upper edges thereof for supporting a starch-containing vat —4—, the said plates being provided with forwardly and rearwardly projecting arms —5— and —5'— for receiving and supporting end drums or rollers —6— and —7— carrying the extreme front and rear portions of a longitudinally movable endless apron —8—.

The main supporting frame is adapted to rest upon the floor and supports the various parts at suitable height to permit easy access thereto by the operator standing on the floor, the rear end of the frame being provided with an extension —9— constituting a delivery table upon which the articles are deposited by the conveyer belt —8— after being passed through the starch-containing vat in the manner herein described.

The cross bar or bed-plate —2— is centrally mounted in the frame a sufficient distance below the upper edges of the side plates to support the vat —4— wholly below the top of the frame and within convenient reaching distance of the operator.

The vat —4— which rests upon the bed-plate —2— is also centrally located within the frame and extends from side to side between the side plates and is provided with a starch inlet —10— and a drainage outlet —11—, both of which passages are located at or near the bottom which is substantially flat and horizontal and of sufficient capacity to receive and retain the desired quantity of starch and to permit the operation of vertically reciprocating pressing elements —12— and —13— together with suitable guide rollers —14— and —15— for holding the central portion of lower and upper runs of the conveyer belt —8— within the vat and in a horizontal plane some distance below the opposite ends of the belt, the front and rear ends of the vat being flared upwardly to better facilitate the passage of the belt through the starch.

The roller —6— at the front end of the machine is adjustable to tension the belt, its opposite ends being journaled in boxes —16— which are adjusted in lengthwise ways —17— in arms —5— by screws —18— having hand wheels —19— to tension either or both sides of the belt.

The roller —7— is preferably journaled in stationary bearings —20— on the arms —5'— so that the axes of both rollers —6— and —7— lie in substantially the same horizontal plane.

The upper portions of the belt —8— between the rollers —6— and —7— and adjacent ends of the vat —4— are disposed in a horizontal plane for feeding the articles to the starch-containing vat and delivering the starched articles from said vat on to the delivery table —9— where they may be removed by hand and conveyed in any well known manner through a drying chamber (not shown) preparatory to remoistening and ironing. To this end, the portions of the upper run of the belt directly over the ends of the vat are supported by additional drums or rollers —21— and —22— of substantially the same size and disposed in the same horizontal plane as the rollers —6— and —7— parallel therewith.

The lower run of the belt —8— directly under the rollers —21— and —22— and, also directly over the opposite ends of the vat —4— passes over relatively smaller rollers —23— and —24— which are located just below but in close proximity to the adjacent rollers —21— and —22— parallel therewith and partially within the corresponding ends of the vat.

The lower set of rollers —14— are mounted on the same frame as the rollers —15— some distance below the rollers —23— and —24— and just above the bottom of the vat, for guiding the belt around the lower side of said rollers and beneath the pressing element —12— and spaced a sufficient distance from the pressing element —12— and from the bottom of the vat to avoid friction with said parts.

The upper set of rollers —15— are arranged in the same horizontal plane within the opposite ends of the vat and some distance below that of the rollers —21— and —22— with their lower faces in a plane just above the upper surface of the lower pressing element —12—, for guiding the depressed portion of the upper run of the belt —8— in a horizontal plane parallel with and between the meeting faces of the pressing elements and in close proximity to the upper surface of the lower element —12—.

The distance between the upper set of rollers —15— and, therefore, the length of the depressed portion of the upper run of the belt within the vat is sufficient to receive the full length of one or more collars or cuffs or similar articles to be starched, the belt being of sufficient width to receive a plurality of such articles side by side, thereby rendering the machine capable of starching large quantities of articles within a comparatively short period of time.

Coöperating with the depressed intermediate portion of the upper run of the belt —8— is a separate endless belt or apron —26— of the same width as the belt —8— and having its lower run passed around the under side of the rollers —15— and its front and rear portions passed over the adjacent rollers —21— and —22— in contact with the adjacent portions of the belt —8—, to positively feed the articles through the starch and between the pressing elements and thence onto the delivery table —9—.

A portion of the belt —26— inclines forwardly and upwardly over the roller —21— at an angle with the adjacent portion of the belt —8— to facilitate the feeding of the articles between the two aprons and for this purpose is passed around a roller —27— and thence upwardly and rearwardly over additional rollers —28— and —29— which latter are disposed in the same horizontal plane a considerable distance above the upper pressing element —13— to permit free access to the interior of the vat and facilitate the removal of the upper pressing elements when necessary.

These rollers —28— and —29— are journaled in suitable bearings on the upper ends of the upright brackets —30— and —31— which are secured to the upper edges of the side plates —1— of the main supporting frame, the roller —28— being located some distance above and slightly to the rear of the roller —21— while the roller —29— is located a corresponding distance above the roller —22— so that its rear face is in substantially a straight line drawn between the rear face of the roller —15— and front face of the roller —22— to cause the rear portion of the belt —26— to contact with the belt —8— between the rollers —15— and —22—.

This arrangement of the belts facilitates the automatic stripping of the starched collars from the upper belt onto the delivery end of the lower belt by which they are conveyed to the delivery table —9—.

The conveyer belt or apron —8— is positively driven in the direction indicated by arrow —X—, Figs. 2 and 3, by the rollers —7—, —22— and —21— which are provided with spiral gears —34— meshing with similar spiral gears —35— on a counter shaft —36— the latter being journaled in suitable bearings —37— at right angles to the axes of said rollers, said spiral gears being all of the same size to drive the rollers at the same speed.

The belt —26— is driven in the direction indicated by arrow —Y— by frictional contact with the upper side of the apron —8— so that their contacting sides travel in the same direction, the roller —7— being provided with spiral ribs —40— of opposite pitch merging at the center for straightening out any wrinkles or folds which may tend to form in the lower belt and keeping said belt substantially flat throughout its length.

The counter shaft —36— and, therefore, the conveyer belts or aprons —8— and —26— are actuated intermittingly and in synchronism with the movement of the pressing elements by suitable mechanism hereinafter described and so that the aprons will be at rest during the pressing operation and will be moved longitudinally only when the pressing elements are separated, thereby avoiding any possibility of breaking or overstraining the aprons.

The lower pressing element —12— preferably consists of a rectangular frame disposed in a horizontal position within the vat beneath the depressed contacting portions of the belt and provided with a perforated top or press plate, and is provided near its four corners with upwardly projecting supporting arms —41— having out-turned apertured lugs —42— which overhang the upper edges of opposite sides of the main supporting frame for receiving vertical guide bolts or studs —43— on said frame and rest upon coil springs —44— which surround the bolts —43— between the lugs —42— and frame thereby allowing the lower pressing element to yield under the pressure of the press-head —13— and assuring a uniform pressure upon the articles and equal distribution of the starch therethrough.

The upper ends of the bolts are provided with adjustable nuts —45— for limiting the upward movement of the lower pressing element and also bringing it into parallelism with the press-head.

The upper pressing element or press head —13— preferably consists of a rectangular box-like frame of substantially the same area as the lower pressing element and is provided at its opposite sides with upwardly extending arms —47— having outwardly projecting apertured lugs or ears —48— which are adjustably secured to the upper ends of a pair of upright guide rods —49— by means of nuts —50—.

These guide-rods are located at the outer sides of the main supporting frame and are movable vertically through guides —51—, the lower ends of said bolts being pivotally connected to the upper ends of pitmen —52— having their lower ends journaled on eccentrics —53— on opposite ends of a cross shaft —54— as shown more clearly in Fig. 4, for reciprocating the upper pressing element vertically toward and from the lower pressing element and into and out of contact with the interposed portion of the aprons —8— and —26—, thereby forcing the starch through the aprons and articles between them by alternate pressure and suction.

The suction of the starch through the fabric by the upward movement of the press-head —13— is materially aided by the use of a sliding band —55— which is yieldingly mounted with an easy sliding fit upon the lower end of the said press head so as to normally project some distance below its lower face and is provided at suitable intervals with upright studs or posts —56— passing loosely through apertured flanges on the press head and having their lower and upper ends surrounded by coil springs —57— which yieldingly hold the band at the limit of its downward movement and at the same time permit said band to yield upwardly during the pressing operation.

It is now clear that when the press head is forced downwardly, the lower edge of the band —55— first contacts with the underlying portion of the aprons after which the lower face of the press head continues to move into engagement with said apron for forcing the starch through the underlying portions of the aprons and interposed articles, such as collars and cuffs, thus producing more or less compression of the lower springs —57— while on the initial return movement of the press head, the lower edge of the band remains by its own weight, aided by said lower springs, in contact with the underlying portion of the apron to increase the force of suction of the press head until said entire press head with the band thereon is freed from contact with the apron by continued upward movement, whereby the starch is drawn through the perforated top of the lower pressing element and superposed portions of the foraminous aprons and articles which may be held between them.

The amount of movement of the press head is slightly greater than the normal distance between the pressing elements so that when the press head approaches the limit of its downward movement, the lower pressing element is caused to yield against the resilient pressure of the springs —44—, thereby depressing the interposed portions of the aprons and articles thereon to assure a more uniform pressure and even distribution of the starch throughout all portions of the articles which are usually spread out flatwise upon the aprons when inserting them into the machine.

It is now clear that the upper pressing element or press head is reciprocated positively a certain distance while the relative movement of the yielding band —55— and lower pressing element —12— is somewhat variable according to the thickness of the articles which may be interposed between the depressed portions of the aprons, thereby assuring more uniform starching of articles of different thicknesses.

The cross shaft —54— is driven continuously from a main driving shaft —60— which is journaled in suitable bearings —61— on opposite sides of the main supporting frame parallel with the shaft —54— and transmits motion to said cross shaft through the medium of intermeshing gears —62— shown more clearly in Fig. 5, the main driving shaft being provided with suitable pulleys —63— adapted to be connected to any available source of power not shown.

As previously intimated, the countershaft —36— and aprons driven thereby are actuated intermittingly only when the pressing elements are separated so as to be at rest during the pressing operation to prevent any strain upon the aprons and for this purpose one end of the cross shaft —54— is provided with an eccentric stud or wrist pin —65— which is connected by a pitman —67— to a rock arm or yoke —69— the latter being loosely mounted on the shaft —36— to hold the upper end of the pitman in operative relation to said shaft.

A pawl —72— on the yoke —69— engages with the teeth of a ratchet wheel —73— which is rigidly secured to the shaft —36— so as to rotate said shaft in the direction indicated by arrow, Fig. 4, at each upward movement of the pitman —67—, the pawl being free to trail on the face of the teeth on the downward movement of said pitman.

The cranks or eccentrics —53— and —65— are so adjusted and timed as to move the apron endwise a predetermined distance while the press head is being raised and to hold it against movement while the press head is in its pressing position so that the pressing and shifting operations alternate with each other.

As the portions of the aprons between which the starched articles are held emerge from the starching vat they contain an excessive amount of starch and one of the important features of my invention is to provide simple means for removing this excessive starch immediately upon the exit of the articles from the vat and before depositing the same upon the delivery table and for this purpose is provided a pliable squeezing roller —75— having a central core or shaft —76— extending transversely of the machine just in front of the roller —22— and its opposite ends journaled in forwardly and rearwardly movable bearings —77— which are adjustable by means of screw bolts —78— to bring the periphery of said roller into pressing coaction with the front face of the roller —22— or rather into pressing engagement with the portions of the aprons which are interposed between said rollers, said bearings —77— being yieldingly held in their adjusted positions by coil springs —80— interposed between adjusting nuts —81— on the rear ends of the bolts —78— and the adjacent ends of guides —82— on the arms —31— through which the bolts —78— are passed.

The bearings —77— are open at their rear sides to permit the removal of the squeezing roller —75— when desired for cleansing or other purposes and are preferably formed upon the upper end of swinging arms —83— which are pivoted at their lower ends at —84— to the sides —1— of the main supporting frame as shown more clearly in Fig. 2.

The squeezing roller —75— consists of a cylindrical body —85— of soft but resilient pliable composition such as soft rubber mixed with a ciliary substance acting as a bond, the entire composition being covered by a soft rubber sleeve —86— and together with the composition filling is not only adapted to resist deterioration by the starch but effectively prevents an accumulation of the starch thereon and causes the excess starch expressed from the aprons and articles to flow back into the vat.

The object of making this roller of soft pliable material is to enable its periphery to conform to different thicknesses on the collars, cuffs or other articles which may be carried between the pressing rollers by the aprons so as to more effectively remove the excessive amounts of starch from all portions of said articles and thereby assure a uniform distribution of the starch throughout all portions thereof.

This roller also prevents the deposit of excess starch upon the horizontal delivery end of the belt and consequently upon the collars, cuffs and other articles which are carried thereby to the delivery table.

By loosening or removing the nuts —81— on the rear ends of the bolts —78—, the supporting arms —83— may be rocked forwardly a sufficient distance to allow the roller —75— to be removed from its bearings and thoroughly cleansed whenever necessary.

Another important feature of the invention is that the press head together with all parts carried thereby may be easily and quickly removed by simply removing the nuts upon the upper ends of the bolts —49— and lifting the press head upwardly and laterally from under the upper horizontal portion of the apron —26—, thus permitting access to the interior of the starch vat and lower pressing element when desired for inspection or repairs.

It is also evident that the entire lower pressing element together with the rollers —14— and —15— may be removed by simply removing the nuts —45— on the upper ends of the bolts —43— and then lifting said parts upwardly and laterally after the press head has been removed, it being understood, of course, that if it is desired to withdraw the lower pressing element from the machine, it will be necessary to displace the aprons.

In operation, the articles to be starched are placed by hand upon the horizontal feeding end of the apron —3— which carries said articles forwardly until caught between the front portions of the aprons adjacent the roller —21— whence they are conveyed rearwardly and downwardly into and through the starch in the vat and thence upwardly between the rollers —22— and —75— where the excess starch is expelled and caused to flow back into the vat after which the uniformly starched articles are deposited upon and conveyed by the delivery end of the belt —8— to the delivery table —9— from which they may be removed by hand and conveyed by any well known form of conveyer to a drying room preparatory to re-moistening and starching.

During the intermission or rest of the feeding aprons, the pressing elements are reciprocated or brought into pressing coaction for forcing the starch through the depressed portion of the apron and articles thereon alternately by pressure and suction, thereby producing an even distribution of the starch through all portions of such articles as they pass through the vat.

The structure shown in Figs. 15 to 18 inclusive differs from that previously described in that the lower pressing element —12— is rigidly but removably clamped to the main frame while the upper press head —13— is yieldingly connected to its operating rods —49— by coil springs —25— which surround the upper ends of said rods between the apertured lugs —48— and adjustable nuts —32—, the press head being provided with vent openings —33— therethrough to prevent the trapping of air and excessive suction at the meeting faces of the pressing elements.

Another difference is that the bottom of the vat —4— is provided with a steam jacket —38— connected to a steam supply pipe —39— to keep the starch at a uniform temperature.

Otherwise the structure and operation of this modification is substantially the same as previously described.

What I claim is:

1. In a starching machine, a starch-containing vat, lower and upper conveyer belts having contacting portions depressed into the vat and other portions at the receiving end of said vat disposed in forwardly diverging planes to facilitate the entry of articles to be starched between the belts and squeezing rollers engaging the portions of the belts in the delivery end of the vat, the portion of the upper belt above the adjacent faces of said rollers being disposed in approximately the same plane as that of the portion immediately below such faces to facilitate stripping of the starched articles therefrom.

2. In a starching machine, a main frame, a vat supported thereby, a bed-plate supported by the frame independently of the vat, a press-head movable toward and from the upper surface of the bed-plate, means for reciprocating the press-head, conveyer belts having contacting portions traveling between the bed-plate and press-head, and means for actuating one of the belts.

3. In a machine of the class described, the combination with a tank of a bed-plate arranged in said tank, a plunger movable toward and from the bed-plate, a movable band surrounding the plunger and resilient means normally holding the band extending below the plunger.

4. In a machine of the class described, the combination with a tank of a bed-plate arranged in said tank, a reciprocating plunger, a vertically slidable band surrounding the plunger, spring means normally holding the band extending below the plunger, and means for reciprocating the plunger toward and from said plate.

5. In a starching machine, a main frame, a vat supported thereby, a bed-plate carried by the frame and positioned within the vat, a resiliently supported press head movable toward and from the upper surface of the bed-plate, conveyer belts having contacting portions traveling between the bed-plate and press head, means for intermittently actuating one of the belts and means for bringing said press head into pressing coaction with the bed plate only while the feeding means is at rest.

6. In a starching machine, a bed-plate, a press head movable toward and from the upper surface of the bed-plate, one of said elements being resiliently supported, a main frame carrying the bed-plate, a vat carried by the main frame and inclosing the bed-plate, conveyer belts having contacting portions traveling between the bed-plate and press head, means for intermittently actuating one of the belts and means for bringing said press head into pressing coaction with the bed plate only while the feeding means is at rest.

In witness whereof I have hereunto set my hand this 14th day of September, 1914.

PHILIP N. BRAUN.

Witnesses:
H. E. CHASE,
VIOLA HOWLAND.

Copies of this patent may be obtained for five cents each, by addressing the "Commissioner of Patents, Washington, D. C."